United States Patent
Yu et al.

(10) Patent No.: US 12,219,548 B2
(45) Date of Patent: Feb. 4, 2025

(54) RADIO RESOURCE ALLOCATION FOR MULTI-USER MIMO

(71) Applicant: Telefonaktiebolaget LM Ericsson (PUBL), Stockholm (SE)

(72) Inventors: Dongsheng Yu, Ottawa (CA); Xixian Chen, Ottawa (CA); Xiaoming Lai, Ottawa (CA); Weigang Li, Ottawa (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 341 days.

(21) Appl. No.: 17/633,666

(22) PCT Filed: Aug. 9, 2019

(86) PCT No.: PCT/IB2019/056812
§ 371 (c)(1),
(2) Date: Feb. 8, 2022

(87) PCT Pub. No.: WO2021/028711
PCT Pub. Date: Feb. 18, 2021

(65) Prior Publication Data
US 2022/0322366 A1 Oct. 6, 2022

(51) Int. Cl.
*H04W 72/121* (2023.01)
*H04B 7/0452* (2017.01)
(Continued)

(52) U.S. Cl.
CPC ........ *H04W 72/121* (2013.01); *H04B 7/0452* (2013.01); *H04W 72/566* (2023.01); *H04L 5/0007* (2013.01)

(58) Field of Classification Search
CPC ............... H04W 72/121; H04W 72/566; H04B 7/0452; H04L 5/0007
See application file for complete search history.

(56) References Cited

U.S. PATENT DOCUMENTS 10,893,562 B1 * 1/2021 Sung ................ H04W 28/0278
2006/0067269 A1 3/2006 Jugl et al.
(Continued)

FOREIGN PATENT DOCUMENTS

CN 102316596 A 1/2012
CN 102892200 A 1/2013
(Continued)

OTHER PUBLICATIONS

PCT International Search Report issued for International application No. PCT/IB2019/056812—Mar. 26, 2020.
(Continued)

*Primary Examiner* — Tejis Daya
(74) *Attorney, Agent, or Firm* — Weisberg I.P. Law, P.A.

(57) ABSTRACT

According to certain embodiments, a method for use in a network node for scheduling wireless transmissions using a plurality of multi-user multiple-input multiple-output (MU-MIMO) transmission layers comprises determining a first wireless device is spatially pairable with a second wireless device and that a scheduling priority of the first device is higher than the second device. The method further comprises allocating frequency domain resources of a first transmission layer for the first device according to its scheduling priority and allocating frequency domain resources in a second transmission layer for the second device according to the priority of the first device. The amount of frequency domain resources allocated in the second transmission layer is no larger than that allocated in the first transmission layer. The method further comprises transmitting the data to first wireless device on first transmission layer and to second wireless device on the second transmission layer.

17 Claims, 7 Drawing Sheets

(51) Int. Cl.
*H04L 5/00* (2006.01)
*H04W 72/566* (2023.01)

(56) References Cited

U.S. PATENT DOCUMENTS

| | | | | |
|---|---|---|---|---|
| 2013/0279457 | A1* | 10/2013 | Takano | H04B 17/318 |
| | | | | 370/329 |
| 2015/0139110 | A1* | 5/2015 | Wang | H04W 72/56 |
| | | | | 370/329 |
| 2015/0195842 | A1 | 7/2015 | Fan et al. | |
| 2019/0215840 | A1* | 7/2019 | Park | H04W 72/0453 |
| 2023/0371031 | A1* | 11/2023 | Priyanto | H04W 72/23 |
| 2024/0155605 | A1* | 5/2024 | Yang | H04W 72/0453 |

FOREIGN PATENT DOCUMENTS

| | | |
|---|---|---|
| CN | 103369688 A | 10/2013 |
| WO | 2016069399 A1 | 5/2016 |
| WO | 2017142356 A1 | 8/2017 |

OTHER PUBLICATIONS

PCT Written Opinion of the International Searching Authority issued for International application No. PCT/IB2019/056812—Mar. 26, 2020.
Akihiko Nishio et al., System Evaluation of MU-MIMO and Multi-Cluster Allocation in LTE-Advanced Uplink—IEEE 2012.
Chinese Office Action with English machine translation dated Oct. 16, 2024 for Patent Application No. 201980099163.0, consisting of 14 pages.

\* cited by examiner

RADIO RESOURCE ALLOCATION FOR MULTI-USER MIMO

PRIORITY

This nonprovisional application is a U.S. National Stage Filing under 35 U.S.C. § 371 of International Patent Application Serial No. PCT/IB2019/056812 filed Aug. 9, 2019 and entitled "Radio Resource Allocation for Multi-User MIMO" which is hereby incorporated by reference in its entirety.

TECHNICAL FIELD

Embodiments of the present disclosure are directed to wireless communications and, more particularly, to allocating radio resources for multi-user (MU) multiple input multiple output (MIMO) wireless transmissions.

BACKGROUND

An increase in the level of traffic such as voice over internet protocol (VoIP), video, web browsing, etc. with diverse quality of service (QoS) requirements has strained the capability of existing wireless networks. The level of mobile data traffic has grown exponentially and is projected to increase by 1000 times in the next five years. The continuous traffic growth and a need to meet required QoS for emerging wireless applications necessitate the industrial and research communities to provide better solutions in wireless communication systems. One solution includes Third Generation Partnership Project (3GPP) fifth generation (5G) new radio (NR) networks that provide increased data rate, low latency, scalable bandwidth, mobility and extended coverage.

To meet these demands, 5G NR started a new era of improved network capacity and higher bandwidth availability to each user. The radio resource allocation for users has emerged as an active research area. Parameters such as number of users, channel conditions, type of traffic class and so on play an important role while designing a radio transmission scheduling algorithm. The task of a scheduler is to distribute scheduling resources to maintain QoS for all users and optimize performance of the network.

Multi-user (MU) multiple input multiple output (MIMO) is a spatial multiplexing scheme where multiple users at a different spatial layer share the same time-frequency resource. It is largely enhanced by massive MIMO beamforming and is widely supported in long term evolution (LTE) and 5G commercial mobile networks to increase cell throughput and capacity, which improves overall network performance and spectrum efficiency.

Several challenges come with implementing MU-MIMO, such as user equipment (UE) pairing, scheduling weight calculation, resource allocation, etc.

SUMMARY

Based on the description above, there currently exist certain challenges with multiple-user multiple-input multiple-output (MU-MIMO), such as user equipment (UE) pairing, scheduling weight calculation, and resource allocation. Particular embodiments described herein include resource allocation for MU-MIMO.

Legacy resource scheduling is single-user based on user priority order. Radio resources are allocated to the UE with highest priority order first, then to the UE with the second priority order, etc. The size of resources allocated to the UE is based on an amount of data in the buffer of the UE and its channel quality. The frequency domain resources can be allocated based on frequency selective scheduling or distributed scheduling. For frequency selective scheduling, the frequency resource with the best channel quality is allocated to the UE to offer the UE an optimized data rate. For distributed scheduling, the frequency resource allocated to the UE is distributed over the frequency domain to take advantage of the diversity in the frequency domain.

For scheduling pairable users for MU-MIMO, particular embodiments share time-frequency resources with more than one UE to take advantage of MU-MIMO for the benefit of higher spectrum efficiency and improved network throughput. This is in contradiction to scheduling one UE at a time in the legacy resource scheduling scheme.

In particular embodiments, a resource allocation algorithm facilitates MU-MIMO transmission by accounting for both UE priority order and UE pairability among the UEs to be scheduled. Time-frequency-spatial resources may be allocated to UEs by selecting MU-MIMO transmission and frequency domain channel conditions to optimize the spectrum efficiency and overall cell throughput.

According to some embodiments, a method for use in a network node for scheduling wireless transmissions in a frequency domain comprising a plurality of MU-MIMO transmission layers comprises determining a first wireless device is spatially pairable with a second wireless device using MU-MIMO transmission and that a scheduling priority of the first wireless device is higher than a scheduling priority of the second wireless device. A first amount of data is buffered for communication with the first wireless device and a second amount of data is buffered for communication with the second wireless device. The method further comprises allocating frequency domain resources of a first transmission layer of the plurality of MU-MIMO transmission layers for transmission of the first amount of data buffered for communication with the first wireless device according to the scheduling priority of the first wireless device and allocating frequency domain resources in a second transmission layer of the plurality of MU-MIMO transmission layers for transmission of an amount of data buffered for communication with the second wireless device according to the scheduling priority of the first wireless device. The amount of frequency domain resources allocated in the second transmission layer is no larger than the amount of frequency domain resources allocated in the first transmission layer. The method further comprises transmitting the buffered data to the first wireless device on the first transmission layer and the buffered data to the second wireless device on the second transmission layer.

In particular embodiments, the method further comprises: determining the second amount of data buffered for communication with the second wireless device is larger than the amount of data buffered for communication with the first wireless device resulting in a remaining amount of data to be communicated to the second wireless device; allocating frequency domain resources for the remaining amount of data according to the scheduling priority of the second wireless device; and transmitting the remaining amount of data to the second wireless device.

In particular embodiments, frequency domain resources of the first transmission layer and frequency domain resources of the second transmission layer comprise a plurality of resource blocks or resource block groups and the resource blocks or resource block groups are allocated in order of channel quality. The frequency domain resources allocated in the second transmission layer may correspond to the frequency domain resources allocated in the first transmission layer.

In particular embodiments, a transmission power allocated per time-frequency resource block or resource block group is the same across the frequency domain independent of a number of layers allocated for each resource block or resource block group. A total transmission power allocated per time-frequency resource block or resource block group of all wireless devices sharing the same resource block or resource block group may be the same across the frequency domain and a power per transmission layer among all wireless devices is evenly distributed. A total transmission power allocated per time-frequency resource block or resource block group may vary across the frequency domain while an allocated power per orthogonal frequency division multiplexed (OFDM) symbol is constant.

In particular embodiments, the second wireless device is allocated two or more frequency domain resources in the frequency domain and the method further comprises determining a link adaptation for the second wireless device based on a function of an amount of power allocated to each of the two or more frequency domain resources. The function may comprise averaging the amount of power allocated to each of the two or more frequency domain resources.

In particular embodiments, the second wireless device is allocated two or more frequency domain resources in the frequency domain and the method further comprises determining a link adaptation for the second wireless device based on a function of an amount of power allocated to each of the two or more frequency domain resources.

According to some embodiments, a network node is operable to schedule wireless transmissions in a frequency domain comprising a plurality of MU-MIMO transmission layers. The network node comprises processing circuitry operable to perform any of the methods performed by the network node described above.

According to some embodiments, a network node is operable to schedule wireless transmissions in a frequency domain comprising a plurality of MU-MIMO transmission layers. The network node comprises a determining module, an allocating module, and a transmitting module. The determining module is operable to determine a first wireless device is spatially pairable with a second wireless device using MU-MIMO transmission and that a scheduling priority of the first wireless device is higher than a scheduling priority of the second wireless device. A first amount of data is buffered for communication with the first wireless device and a second amount of data is buffered for communication with the second wireless device. The allocating module is operable to: allocate frequency domain resources of a first transmission layer of the plurality of MU-MIMO transmission layers for transmission of the first amount of data buffered for communication with the first wireless device according to the scheduling priority of the first wireless device; and allocate frequency domain resources in a second transmission layer of the plurality of MU-MIMO transmission layers for transmission of an amount of data buffered for communication with the second wireless device according to the scheduling priority of the first wireless device. The amount of frequency domain resources allocated in the second transmission layer is no larger than the amount of frequency domain resources allocated in the first transmission layer. The transmitting module operable to transmit the buffered data to the first wireless device on the first transmission layer and transmit the buffered data to the second wireless device on the second transmission layer.

Also disclosed is a computer program product comprising a non-transitory computer readable medium storing computer readable program code, the computer readable program code operable, when executed by processing circuitry to perform any of the methods performed by the network node described above.

Certain embodiments may provide one or more of the following technical advantages. For example, particular embodiments improve user equipment and overall cell throughput.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
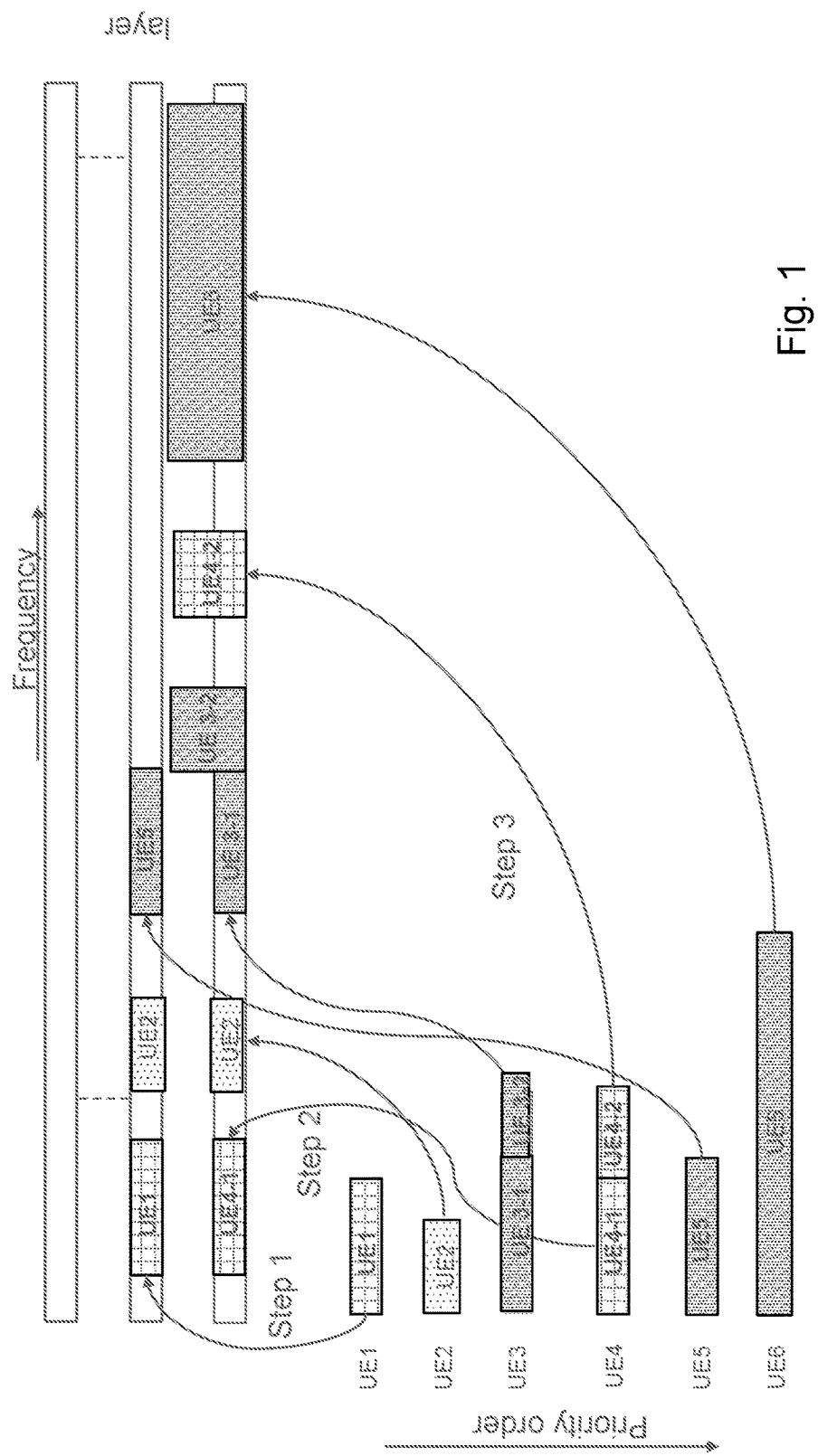
FIG. 1 is a frequency allocation diagram illustrating resource scheduling for multiple-user multiple-input multiple-output (MU-MIMO), according to some embodiments.

One challenge with scheduling for multiple-user multiple-input multiple-output (MU-MIMO) wireless transmission is that resource scheduling is single-user based on user priority order. Certain aspects of the present disclosure and their embodiments may provide solutions to these or other challenges. For scheduling pairable user equipment (UE) for MU-MIMO, particular embodiments share time-frequency resources with more than one UE to take advantage of MU-MIMO for the benefit of higher spectrum efficiency and improved network throughput.

For example, in some embodiments pairable UEs are scheduled by the priority order of the UE (among these pairable UEs) with the highest priority, but the resources allocated to the lower priority UEs are no larger than the resource allocated to the highest priority UE. Any remaining portion of the data buffer of the lower priority UEs are scheduled according to the original priority orders of the lower priority UEs.

In some embodiments, the power per time-frequency resource (Resource block (RB), or resource block group (RBG)) is the same across the frequency domain regardless of how many layers are allocated in each RB/RBG. In some embodiments, the transmission power of a UE with time-frequency-spatial resource allocation is adjusted such that total power per RB/RBG of all UEs sharing the same resource is the same across the frequency domain, and the power per layer among UEs is evenly distributed. Some embodiments allocate different power for different RB or RBGs with the condition that the total power allocated to one OFDM symbol is a constant value.

In some embodiments, link adaptation for MU-MIMO pairable UEs is determined by taking the averaged power allocated to the UE across the frequency domain even though the allocated power for different resource portions are different. Some embodiments includes frequency selective resource allocation.

Particular embodiments are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

Particular algorithms for calculating a scheduling weight for MU-MIMO UEs may include channel quality weight calculation based on information bits and user pairability for MU-MIMO. Some algorithms include pairable UE priority weight adjustment during the scheduling phase in which one or both of a downlink scheduling list and an uplink scheduling list are re-sorted based on the newly calculated weights. The downlink scheduling list and uplink scheduling list are passed to physical downlink shared channel (PDSCH) and physical uplink shared channel (PUSCH) resource allocators. Particular embodiments described herein include resource scheduling in the downlink and/or uplink resource allocator that accounts for MU-MIMO paired UEs.

FIG. 1 is a frequency allocation diagram illustrating resource scheduling for multiple-user multiple-input multiple-output (MU-MIMO), according to some embodiments. The block diagram illustrates data buffers for six UEs (UE1-UE6) and how the data buffers are assigned to time frequency resources across multiple layers.

In the illustrated example, UE1-UE6 have highest priority orders based on scheduling weight calculation and adjustment and are passed to resource allocator for scheduling. Each UE may have different buffer size. UE1 and UE4 are pairable UEs, UE2 has no pairable UE, UE3 and UE5 are pairable UEs.

Particular embodiments include resource allocation of pairable UEs. The UE with highest priority order is scheduled first with an amount of resource matching its buffer size. In the example illustrated in FIG. 1, UE1 has the highest priority order and is scheduled first with time-frequency resource allocation matching its buffer size (Step 1).

The time-frequency resource allocated to the first UE cannot be allocated at different spatial layers to any other UEs except other UEs that are MU-MIMO pairable with the first UE. In the example of FIG. 1, UE4 is pairable with UE1. Although UE4 has a lower priority order than UE2 and UE3, UE4 may be allocated earlier with resource (UE4-1) which uses the same size resources as allocated to UE1 but at a different spatial layer.

The size of resource (UE4-1) allocated to UE4 (of lower priority order) is limited by the size of resource allocated to UE1 (of higher priority order), which might only take a portion of data from UE4 buffer. In such case, the rest of data (UE4-2) in the UE4 buffer is scheduled according to its original priority order. Thus, the resource allocator schedules UE-2 and UE-3 (Step 2) before scheduling the remaining UE4-2 portion (Step 3).

As described above, in some embodiments pairable UEs are scheduled by the priority order of the UE (among these pairable UEs) with the highest priority, but the resources to be allocated to the lower priority UEs are no larger than the resource allocated to the highest priority UE. The remaining portion of the data buffer, if any, of the lower priority order UEs are scheduled according to the original priority orders of the lower priority UEs.

Some embodiments include transmission power allocation for MU-MIMO resource scheduling. In particular embodiments, the power per time-frequency resource (Resource block (RB), or resource block group (RBG)) is the same across the frequency domain no matter how many layers are allocated in each RB/RBG.

For MU-MIMO transmission, resources in the frequency domain are allocated to multiple users. UEs for single user (SU) MIMO transmission occupy the RBs/PRBs alone and the number of layers allocated is based on the channel rank of the UE. In the example of FIG. 1, UE2 has channel rank of 2 and occupies two layers of time-frequency resources. UE4 has rank of 1 and occupies one layer of time-frequency resources with two different portions. The portion UE4-1 occupies one layer which shares the same time-frequency resource with UE1 at another layer. UE4-2 occupies one layer and occupies the time-frequency resource by itself. The total power per RB/RBG of the time-frequency resource occupied by UE1 and UE4-1 is the same as the total power per RB or RBG of the time-frequency resource occupied by UE4-2. Effective power allocation for UE4-2 is two times as that for UE4-1.

In some embodiments, the transmission power of a UE with time-frequency-spatial resource allocation is adjusted such that total power per RB/RBG of all UEs sharing the same resource is the same across the frequency domain, and the power per layer among UEs is evenly distributed.

Other embodiments allocate different power for different RB or RBGs. An example is illustrated in FIG. 2.

Figure 2:
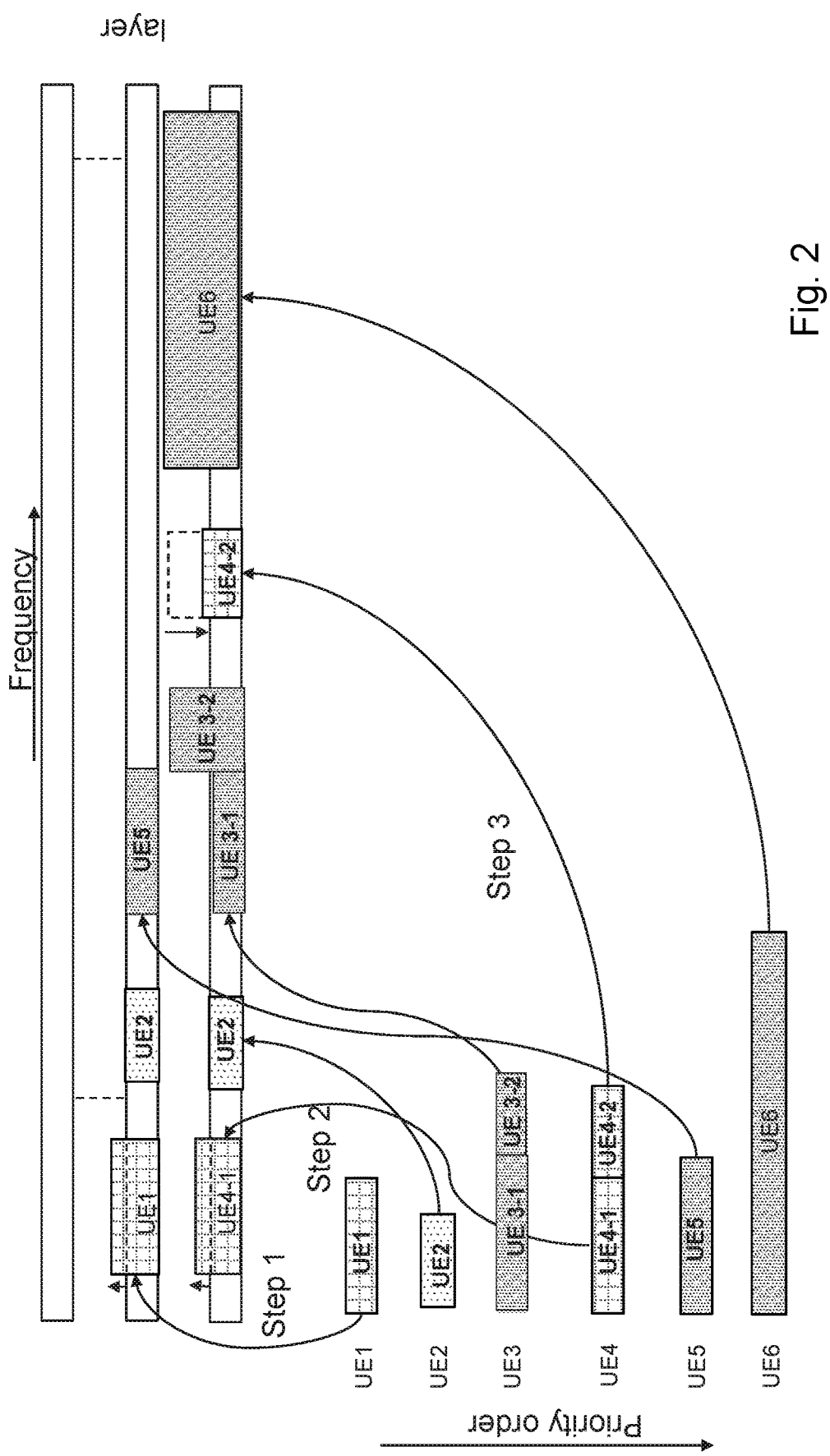
FIG. 2 is a frequency allocation diagram illustrating power scheduling for MU-MIMO, according to some embodiments.

FIG. 2 is a frequency allocation diagram illustrating power scheduling for MU-MIMO, according to some embodiments. In the illustrated example, a resource allocator may increase the power allocated to UE1 and UE4-1 (Step 1) at the expense of reducing the power allocated to UE4-2 (Step 3), because the resources allocated to UE1 and UE4-1 carry two UEs' MIMO transmission, but the resources allocated to UE4-2 only carry one UE's data transmission.

The criterion for allocating different power for different RB and RBGs may be that the total power allocated to one orthogonal frequency division multiplexing (OFDM) symbol is a constant value. A benefit is that it prevents generating extra interference to its neighbor cells. This strategy gives the scheduler more freedom to improve the overall cell throughput.

Some embodiments include frequency selective resource allocation. Frequency selective resource allocation allocates the resources in order of channel quality to either empty a UE's data buffer or achieve the highest throughput using a minimum number of allocated RBs or RBGs. The allocated resources can be non-contiguous. In one embodiment, the resource allocation can be done in a unit of RBG. An example is illustrated in FIG. 3.

Figure 3:
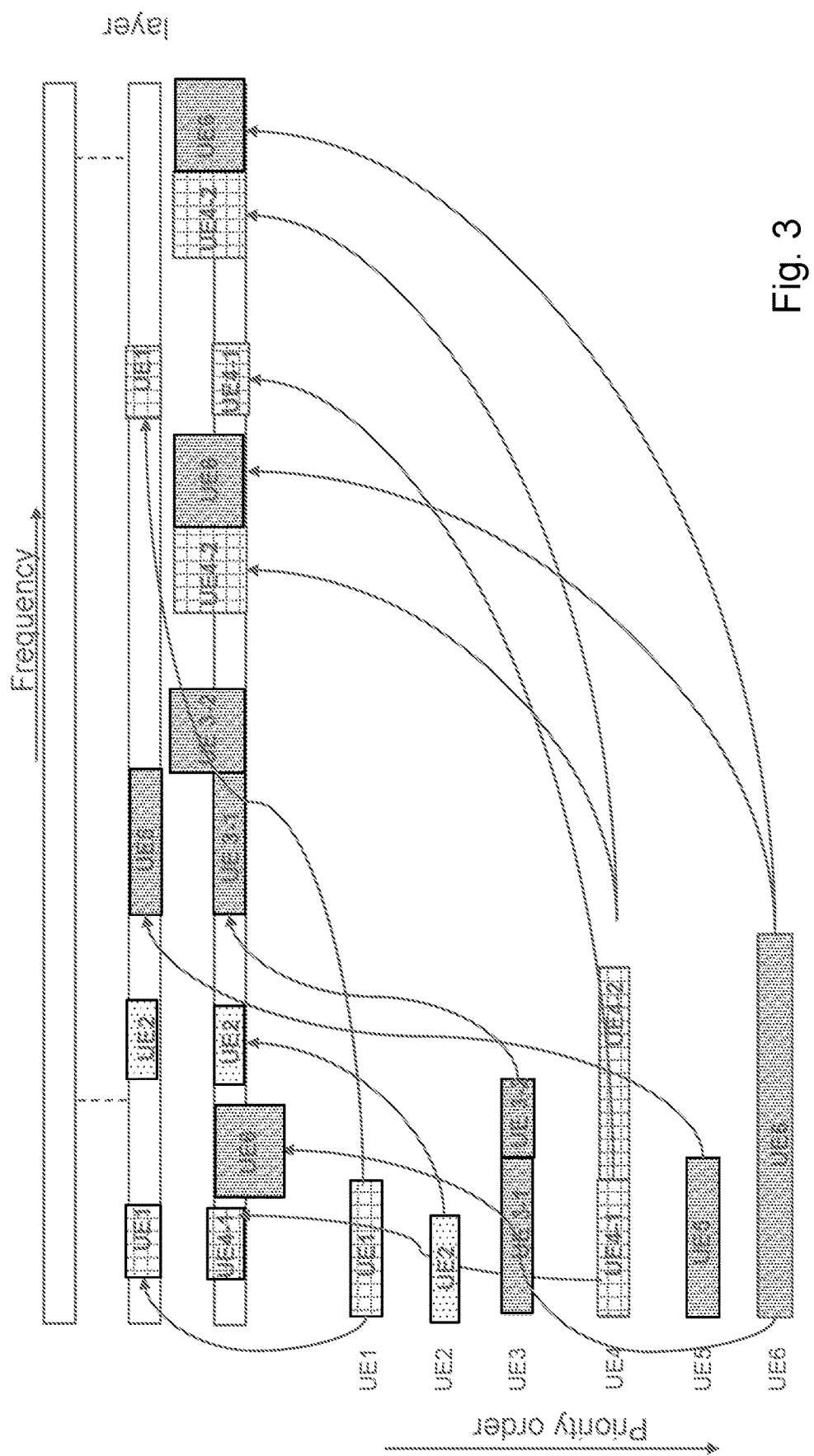
FIG. 3 is a frequency allocation diagram illustrating frequency selective resource allocation for MU-MIMO, according to some embodiments.

FIG. 3 is a frequency allocation diagram illustrating frequency selective resource allocation for MU-MIMO, according to some embodiments. When a resource allocator allocates resources for a pair of UEs (e.g., UE1 and UE4), the RBG resources can be allocated one by one in the order of their channel quality. The first RBG to be allocated is selected such that it gives the highest combined throughput (Ue1InforBits(RbgId)+Ue4InforBits (RbgId)) for UE1 and UE4 among all available RBGs. Ue1InforBits(RbgId) and Ue4InforBits(RbgId) are the information bits that one RBG (RbgId) can carry for UE1 and UE4, respectively.

If the data buffer of UE1 cannot be emptied, the second RBG with the highest combined throughput among all available RBGs may be allocated. The total throughput for UE1 and UE4 are (Ue1InforBits(RbgId1)+Ue1InforBits(RbgId2)), and (Ue4InforBits(RbgId1)+Ue4InforBits(RbgId2)), respectively. The process may be repeated until either the data buffer of UE1 (its total throughput is greater than or equal to the total data bits in the data buffer) is emptied or all the available RBGs are allocated.

Figure 4:
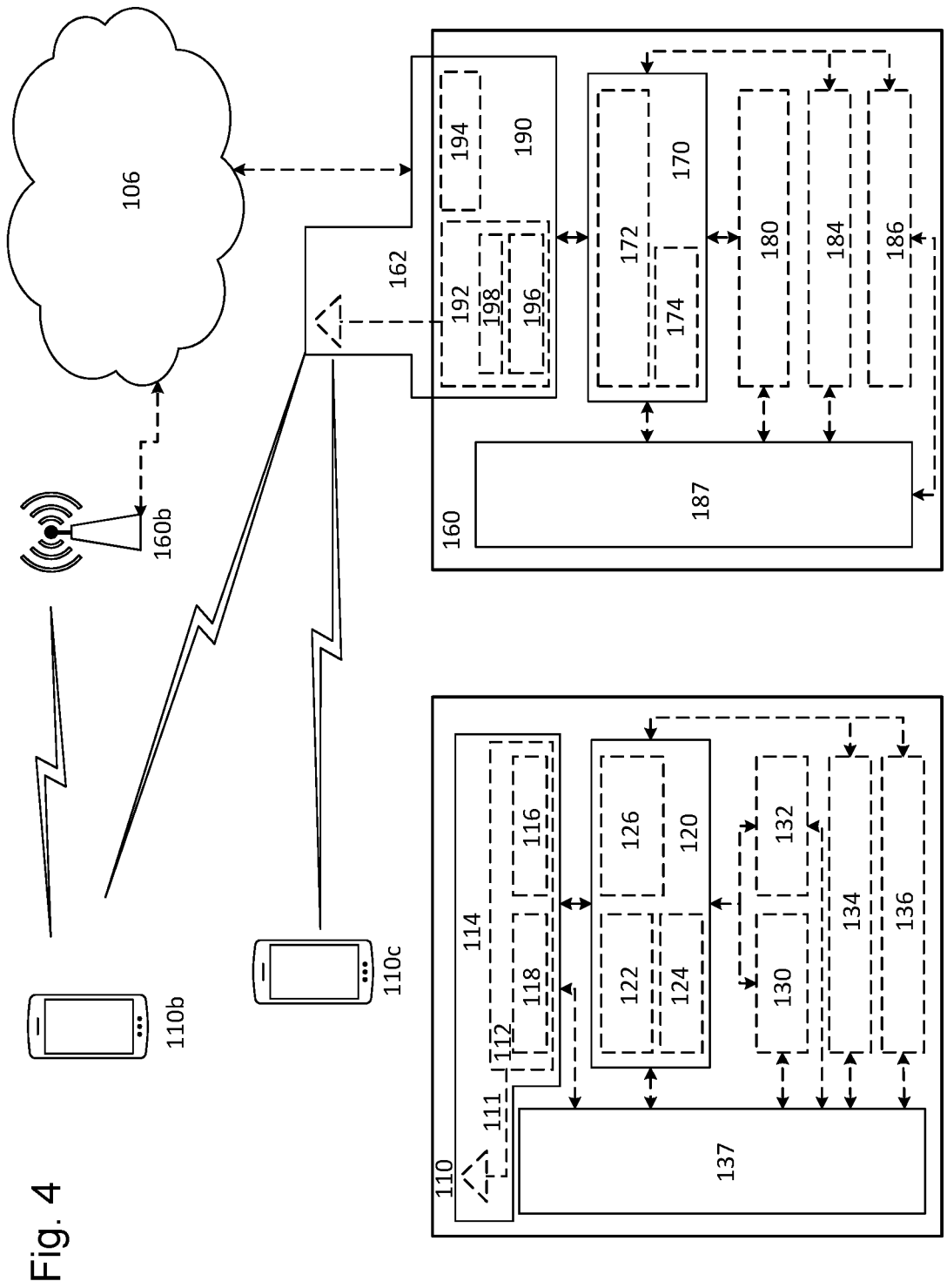
FIG. 4 is a block diagram illustrating an example wireless network.

FIG. 4 illustrates an example wireless network, according to certain embodiments. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and may then also be referred to as femto base stations, pico base stations, micro base stations, or macro base stations.

A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 4, network node 160 includes processing circuitry 170, device readable medium 180, interface 190, auxiliary equipment 184, power source 186, power circuitry 187, and antenna 162. Although network node 160 illustrated in the example wireless network of FIG. 4 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and an RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node, such as the scheduling operations described herein and with respect of FIGS. 2-4. The operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units.

In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 4 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air.

In some embodiments, a WD may be configured to transmit and/or receive information without direct human interaction. For instance, a WD may be designed to transmit information to a network on a predetermined schedule, when triggered by an internal or external event, or in response to requests from the network.

Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device.

As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one example, the WD may be a UE implementing the 3GPP narrow band internet of things (NB-IoT) standard. Examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation.

A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g. RAM or ROM), mass storage media (e.g., a hard disk), removable storage media (e.g., a CD or a DVD), and/or any other volatile or non-volatile, non-transitory device readable and/or computer executable memory devices that store information, data, and/or instructions that may be used by processing circuitry 120. In some embodiments, processing circuitry 120 and device readable medium 130 may be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Although the subject matter described herein may be implemented in any appropriate type of system using any suitable components, the embodiments disclosed herein are described in relation to a wireless network, such as the example wireless network illustrated in FIG. 4. For simplicity, the wireless network of FIG. 4 only depicts network 106, network nodes 160 and 160*b*, and WDs 110, 110*b*, and 110*c*. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The communication system 106 may itself be connected to a host computer (not shown), which may be embodied in the hardware and/or software of a standalone server, a cloud-implemented server, a distributed server or as processing resources in a server farm. The host computer may be under the ownership or control of a service provider or may be operated by the service provider or on behalf of the service provider.

Figure 5:
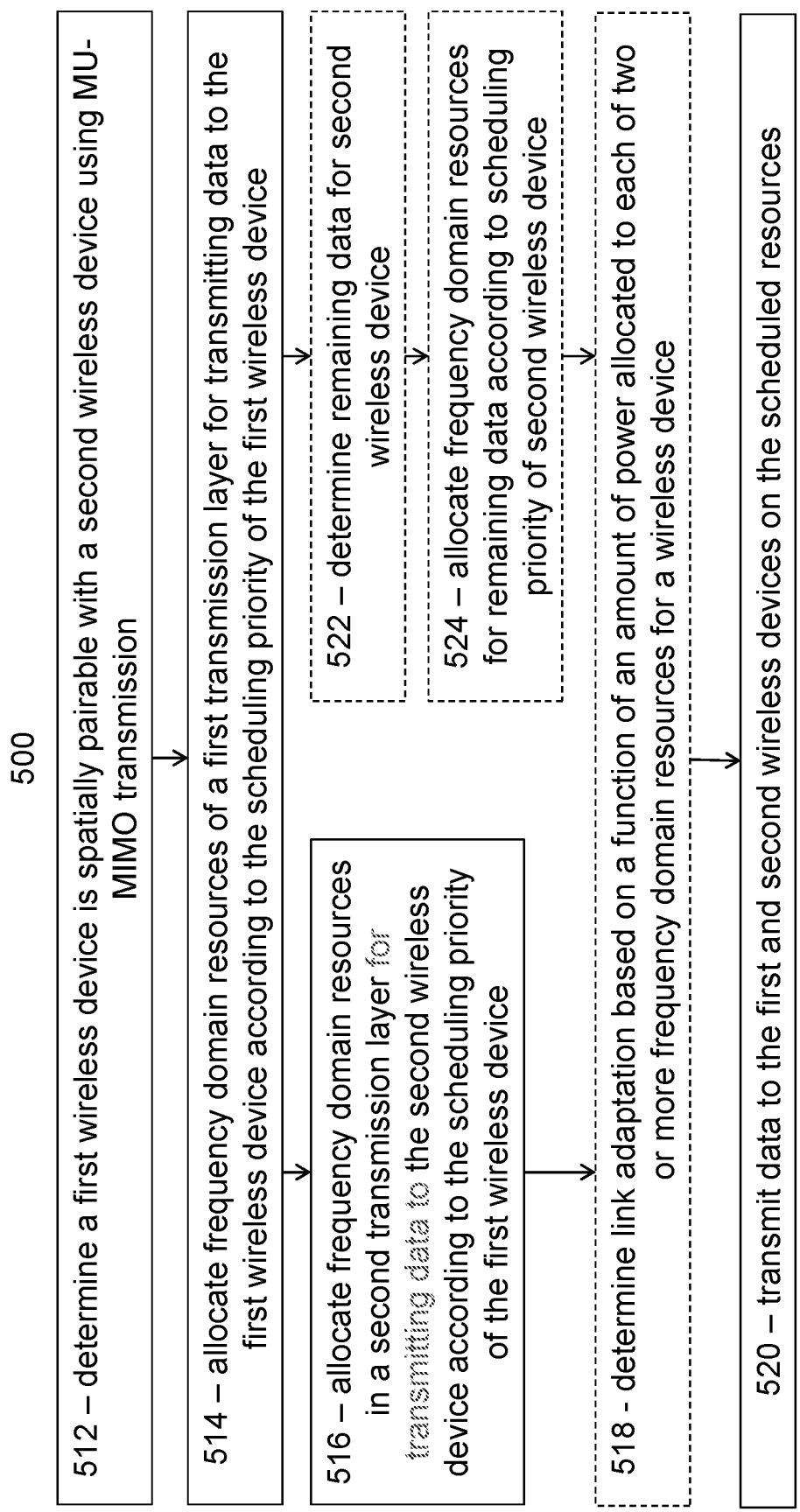
FIG. 5 is a flowchart illustrating an example method in a network node, according to certain embodiments.

The communication system of FIG. 5 as a whole enables connectivity between one of the connected WDs 110 and the host computer. The connectivity may be described as an over-the-top (OTT) connection. The host computer and the connected WDs 110 are configured to communicate data and/or signaling via the OTT connection, using an access network, a core network, any intermediate network and possible further infrastructure (not shown) as intermediaries. The OTT connection may be transparent in the sense that at least some of the participating communication devices through which the OTT connection passes are unaware of routing of uplink and downlink communications.

The host computer may provide host applications which may be operable to provide a service to a remote user, such as a WD 110 connecting via an OTT connection terminating at the WD 110 and the host computer. In providing the service to the remote user, the host application may provide user data which is transmitted using the OTT connection. The "user data" may be data and information described herein as implementing the described functionality. In one embodiment, the host computer may be configured for providing control and functionality to a service provider and may be operated by the service provider or on behalf of the service provider. The host computer may be enabled to observe, monitor, control, transmit to and/or receive from the network node 160 and or the wireless device 110.

One or more of the various embodiments in this disclosure improve the performance of OTT services provided to the WD 110 using the OTT connection. More precisely, the teachings of some of these embodiments may improve the data rate, latency, and/or power consumption and thereby provide benefits such as reduced user waiting time, relaxed restriction on file size, better responsiveness, extended battery lifetime, etc.

FIG. 5 is a flowchart illustrating an example method 500 in a network node, according to certain embodiments. In particular embodiments, one or more steps of FIG. 5 may be performed by network node 160 described with respect to FIG. 4. The network node is operable to schedule wireless transmissions in a frequency domain comprising a plurality of MU-MIMO transmission layers.

The method begins at step 512 where a network node (e.g., network node 160) determines a first wireless device is spatially pairable with a second wireless device using MU-MIMO transmission and that a scheduling priority of the first wireless device is higher than a scheduling priority of the second wireless device. For example, the network node may determine that first and second wireless devices, such as UE1 and UE4 illustrated in FIG. 1, are MU-MIMO spatially pairable and that the UE1 has a higher scheduling priority than the UE4. A first amount of data is buffered for communication with UE1 and a second amount of data is buffered for communication with UE4.

At step 514, the network node allocates frequency domain resources of a first transmission layer of the plurality of MU-MIMO transmission layers for transmission of the first amount of data buffered for communication with the first wireless device according to the scheduling priority of the first wireless device. For example, the network node may allocate frequency domain resources for UE1 as described with respect to Step 1 of FIG. 1.

At step 516, the network node allocates frequency domain resources in a second transmission layer of the plurality of MU-MIMO transmission layers for transmission of an amount of data buffered for communication with the second wireless device according to the scheduling priority of the first wireless device. The amount of frequency domain resources allocated in the second transmission layer is no larger than the amount of frequency domain resources allocated in the first transmission layer.

For example, the network node may allocate frequency domain resources in a second transmission layer for UE4. Even though UE4 has a lower priority than UE2 and UE3, UE4 may be scheduled at the same priority as UE1 because UE1 and UE4 are spatially pairable. The amount of resources allocated to UE4, however, do not exceed those allocated to UE1. Thus, if UE4 has more data for transmission than UE1, the remaining data is scheduled later according to the priority of UE4 (as described with respect to steps 522 and 524).

In some embodiments, the frequency domain resources allocated in the second transmission layer correspond to the frequency domain resources allocated in the first transmission layer.

In some embodiments, frequency domain resources of the first transmission layer and frequency domain resources of the second transmission layer comprise a plurality of resource blocks or resource block groups and the resource blocks or resource block groups are allocated in order of channel quality as described above with respect to frequency selective resource allocation.

In some embodiments, a transmission power allocated per time-frequency resource block or resource block group is the same across the frequency domain independent of a number of layers allocated for each resource block or resource block group. In particular embodiments, a total transmission power allocated per time-frequency resource block or resource block group of all wireless devices sharing the same resource block or resource block group is the same across the frequency domain and a power per transmission layer among all wireless devices is evenly distributed. In other embodiments, a total transmission power allocated per time-frequency resource block or resource block group varies across the frequency domain while an allocated power per orthogonal frequency division multiplexed (OFDM) symbol is constant, such as the example illustrated in FIG. 2.

At step 518, the second wireless device may be allocated two or more frequency domain resources in the frequency domain and the network node may determine a link adaptation for the second wireless device based on a function of an amount of power allocated to each of the two or more frequency domain resources. The function may comprise averaging the amount of power allocated to each of the two or more frequency domain resources. As an example, the network node may determine the link adaptation according to any of the examples and embodiments described above with respect to link adaptation.

At step 520, the network node transmits the buffered data to the first wireless device on the first transmission layer and the buffered data to the second wireless device on the second transmission layer.

In some embodiments, the network node may determine the second amount of data buffered for communication with the second wireless device is larger than the amount of data buffered for communication with the first wireless device resulting in a remaining amount of data to be communicated to the second wireless device at step 522. If so, the network node may allocate frequency domain resources for the remaining amount of data according to the scheduling priority of the second wireless device at step 524.

For example, if after step 514, the network node determines UE4 has remaining data to transmit, then the network node may continue to schedule resources for UE2 and UE3 and then schedule resources for the remaining data for UE4 (i.e., according to the original scheduling priority of UE 4). Then at step 520, the data for UE4 is transmitted partially in the resource allocation made at step 514 and partially in the resource allocation made at step 524.

Modifications, additions, or omissions may be made to method 500 of FIG. 5. Additionally, one or more steps in the method of FIG. 5 may be performed in parallel or in any suitable order.

Figure 6:
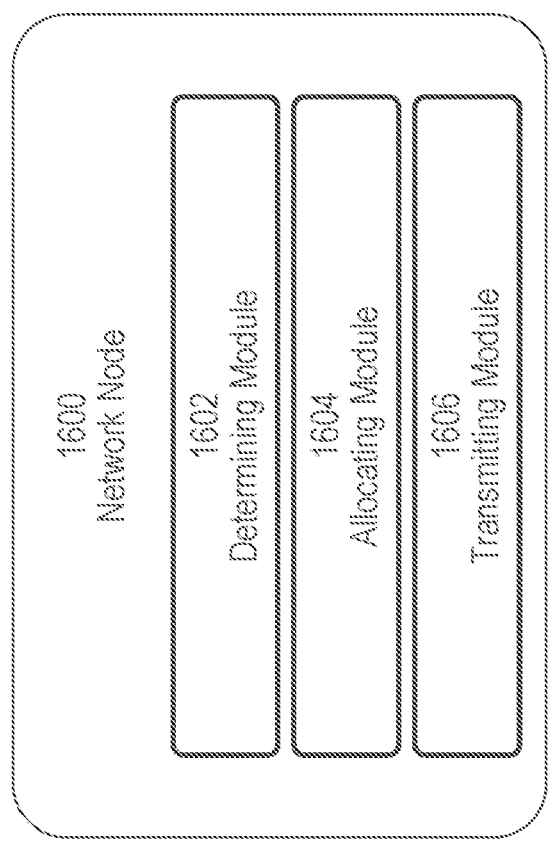
FIG. 6 illustrates an example network node, according to certain embodiments.

FIG. 6 illustrates an example network node, according to certain embodiments. The network node 1600 may comprise network node 160 illustrated in FIG. 4.

Network node 1600 is operable to carry out the example method described with reference to FIG. 5 and possibly any other processes or methods disclosed herein. It is also to be understood that the method of FIG. 5 is not necessarily carried out solely by apparatus 1600. At least some operations of the method can be performed by one or more other entities, including virtual apparatuses.

Network node 1600 may comprise processing circuitry such as 170 of FIG. 4. In some implementations, the processing circuitry may be used to cause determining module 1602, allocating module 1604, transmitting module 1606, and any other suitable units of network node 1600 to perform corresponding functions according one or more embodiments of the present disclosure.

As illustrated in FIG. 6, network node 1600 includes determining module 1602, allocating module 1604, and transmitting module 1606. In certain embodiments, determining module 1602 may determine MU-MIMO spatially pairable UEs and compare scheduling weights according to any of the embodiments and examples described herein. Allocating module 1604 may allocate time/frequency transmission resources according to any of the embodiments and examples described herein. Transmitting module 1606 may transmit data to wireless devices using the allocated resources according to any of the embodiments and examples described herein.

Figure 7:
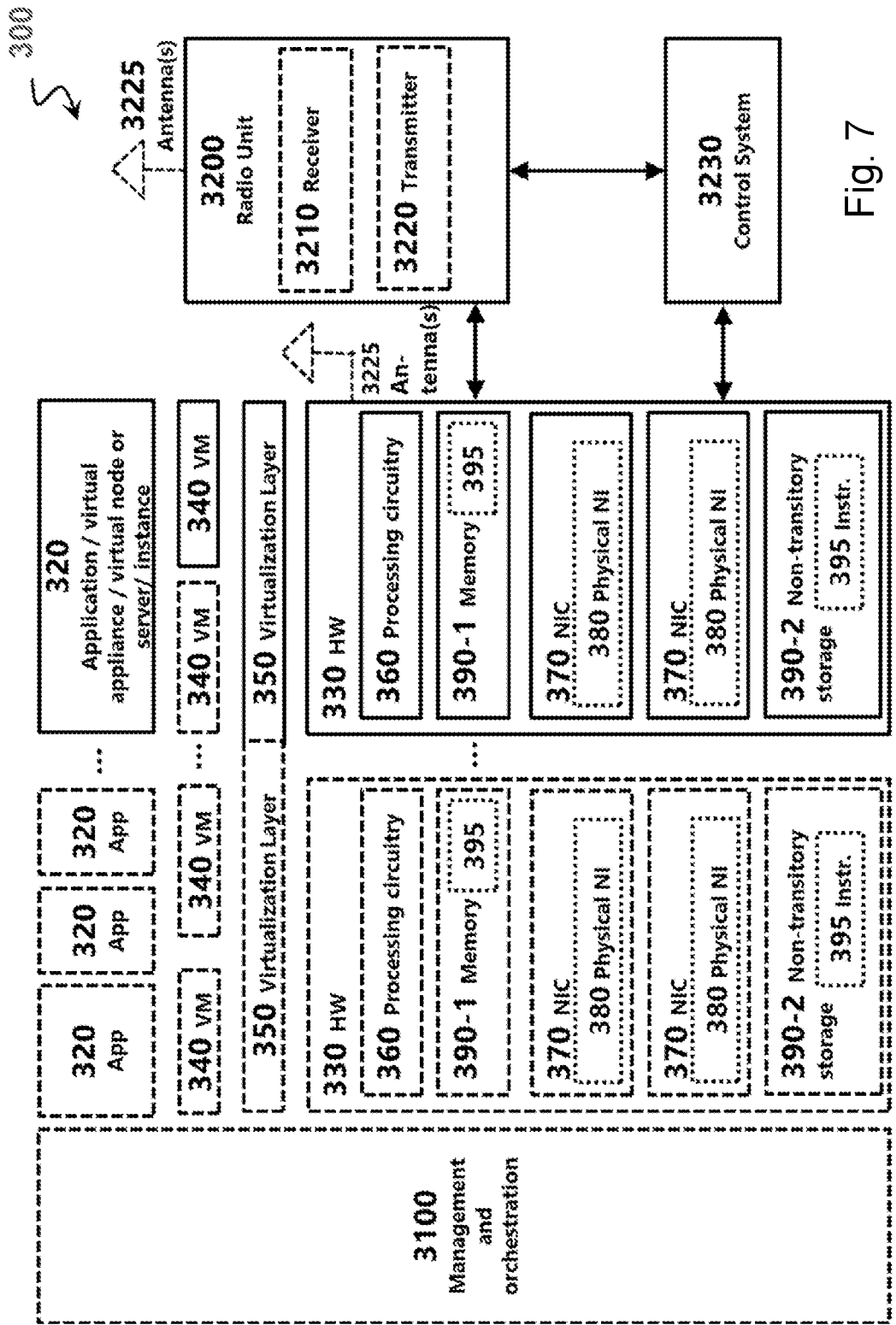
FIG. 7 illustrates an example virtualization environment, according to certain embodiments.

FIG. 7 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein, such as the method of FIG. 5, may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 7, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 7.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be effected with the use of control system 3230 which may alternatively be used for communication between the hardware nodes 330 and radio units 3200.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the claims below.

The invention claimed is:

1. A method for use in a network node for scheduling wireless transmissions in a frequency domain comprising a plurality of multi-user multiple-input multiple-output (MU-MIMO) transmission layers, the method comprising:
   determining a first wireless device is spatially pairable with a second wireless device using MU-MIMO transmission and that a scheduling priority of the first wireless device is higher than a scheduling priority of the second wireless device, a first amount of data being buffered for communication with the first wireless device and a second amount of data is buffered for communication with the second wireless device;
   allocating frequency domain resources of a first transmission layer of the plurality of MU-MIMO transmission layers for transmission of the first amount of data buffered for communication with the first wireless device according to the scheduling priority of the first wireless device;
   allocating frequency domain resources in a second transmission layer of the plurality of MU-MIMO transmission layers for transmission of an amount of data buffered for communication with the second wireless device according to the scheduling priority of the first wireless device, the amount of frequency domain resources allocated in the second transmission layer being no larger than the amount of frequency domain resources allocated in the first transmission layer;
   transmitting the buffered data to the first wireless device on the first transmission layer and the buffered data to the second wireless device on the second transmission layer;
   determining the second amount of data buffered for communication with the second wireless device is larger than the amount of data buffered for communication with the first wireless device resulting in a remaining amount of data to be communicated to the second wireless device;

allocating frequency domain resources for the remaining amount of data according to the scheduling priority of the second wireless device; and transmitting the remaining amount of data to the second wireless device.

2. The method of claim 1, wherein frequency domain resources of the first transmission layer and frequency domain resources of the second transmission layer comprise a plurality of resource blocks or resource block groups and the resource blocks or resource block groups are allocated in order of channel quality.

3. The method of claim 1, wherein the frequency domain resources allocated in the second transmission layer correspond to the frequency domain resources allocated in the first transmission layer.

4. The method of claim 1, wherein a transmission power allocated per time-frequency resource block or resource block group is the same across the frequency domain independent of a number of layers allocated for each resource block or resource block group.

5. The method of claim 1, wherein a total transmission power allocated per time-frequency resource block or resource block group of all wireless devices sharing the same resource block or resource block group is the same across the frequency domain and a power per transmission layer among all wireless devices is evenly distributed.

6. The method of claim 1, wherein a total transmission power allocated per time-frequency resource block or resource block group varies across the frequency domain while an allocated power per orthogonal frequency division multiplexed (OFDM) symbol is constant.

7. The method of claim 1, wherein the second wireless device is allocated two or more frequency domain resources in the frequency domain and the method further comprises determining a link adaptation for the second wireless device based on a function of an amount of power allocated to each of the two or more frequency domain resources.

8. The method of claim 7, wherein the function comprises averaging the amount of power allocated to each of the two or more frequency domain resources.

9. A network node operable to schedule wireless transmissions in a frequency domain comprising a plurality of multi-user multiple-input multiple-output (MU-MIMO) transmission layers, the network node comprising processing circuitry operable to:

determine a first wireless device is spatially pairable with a second wireless device using MU-MIMO transmission and that a scheduling priority of the first wireless device is higher than a scheduling priority of the second wireless device, a first amount of data being buffered for communication with the first wireless device and a second amount of data is buffered for communication with the second wireless device;

allocate frequency domain resources of a first transmission layer of the plurality of MU-MIMO transmission layers for transmission of the first amount of data buffered for communication with the first wireless device according to the scheduling priority of the first wireless device;

allocate frequency domain resources in a second transmission layer of the plurality of MU-MIMO transmission layers for transmission of an amount of data buffered for communication with the second wireless device according to the scheduling priority of the first wireless device, the amount of frequency domain resources allocated in the second transmission layer being no larger than the amount of frequency domain resources allocated in the first transmission layer;

transmit the buffered data to the first wireless device on the first transmission layer and transmit the buffered data to the second wireless device on the second transmission layer;

determine the second amount of data buffered for communication with the second wireless device is larger than the amount of data buffered for communication with the first wireless device resulting in a remaining amount of data to be communicated to the second wireless device;

allocate frequency domain resources for the remaining amount of data according to the scheduling priority of the second wireless device; and transmit the remaining amount of data to the second wireless device.

10. The network node of claim 9, wherein frequency domain resources of the first transmission layer and frequency domain resources of the second transmission layer comprise a plurality of resource blocks or resource block groups and the resource blocks or resource block groups are allocated in order of channel quality.

11. The network node of claim 9, wherein the frequency domain resources allocated in the second transmission layer correspond to the frequency domain resources allocated in the first transmission layer.

12. The network node of claim 9, wherein a transmission power allocated per time-frequency resource block or resource block group is the same across the frequency domain independent of a number of layers allocated for each resource block or resource block group.

13. The network node of claim 9, wherein a total transmission power allocated per time-frequency resource block or resource block group of all wireless devices sharing the same resource block or resource block group is the same across the frequency domain and a power per transmission layer among all wireless devices is evenly distributed.

14. The network node of claim 9, wherein a total transmission power allocated per time-frequency resource block or resource block group varies across the frequency domain while an allocated power per orthogonal frequency division multiplexed (OFDM) symbol is constant.

15. The network node of claim 9, wherein the second wireless device is allocated two or more frequency domain resources in the frequency domain and the processing circuitry is further operable to determine a link adaptation for the second wireless device based on a function of an amount of power allocated to each of the two or more frequency domain resources.

16. The network node of claim 15, wherein the function comprises averaging the amount of power allocated to each of the two or more frequency domain resources.

17. A network node operable to schedule wireless transmissions in a frequency domain comprising a plurality of multi-user multiple-input multiple-output (MU-MIMO) transmission layers, the network node comprising a determining module, an allocating module, and a transmitting module;

the determining module operable to determine a first wireless device is spatially pairable with a second wireless device using MU-MIMO transmission and that a scheduling priority of the first wireless device is higher than a scheduling priority of the second wireless device, a first amount of data being buffered for communication with the first wireless device and a second amount of data is buffered for communication with the second wireless device;

the allocating module operable to:
- allocate frequency domain resources of a first transmission layer of the plurality of MU-MIMO transmission layers for transmission of the first amount of data buffered for communication with the first wireless device according to the scheduling priority of the first wireless device;
- allocate frequency domain resources in a second transmission layer of the plurality of MU-MIMO transmission layers for transmission of an amount of data buffered for communication with the second wireless device according to the scheduling priority of the first wireless device, the amount of frequency domain resources allocated in the second transmission layer being no larger than the amount of frequency domain resources allocated in the first transmission layer; and the transmitting module operable to transmit the buffered data to the first wireless device on the first transmission layer and transmit the buffered data to the second wireless device on the second transmission layer;

the determining module further operable for determining the second amount of data buffered for communication with the second wireless device is larger than the amount of data buffered for communication with the first wireless device resulting in a remaining amount of data to be communicated to the second wireless device;

the allocating module further operable for allocating frequency domain resources for the remaining amount of data according to the scheduling priority of the second wireless device; and the transmitting module further operable for transmitting the remaining amount of data to the second wireless device.

* * * * *